(12) United States Patent
Qiao et al.

(10) Patent No.: US 12,105,745 B2
(45) Date of Patent: Oct. 1, 2024

(54) EMPATHETIC QUERY RESPONSE USING MIXTURE OF EXPERTS

(71) Applicant: International Business Machines Corporation, Armonk, NY (US)

(72) Inventors: Mu Qiao, Belmont, CA (US); Tongtong Liu, San Jose, CA (US); Divyesh Jadav, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/156,465

(22) Filed: Jan. 19, 2023

(65) Prior Publication Data
US 2024/0248920 A1     Jul. 25, 2024

(51) Int. Cl.
| | |
|---|---|
| G06F 16/332 | (2019.01) |
| G06F 16/35 | (2019.01) |
| G06N 3/045 | (2023.01) |
| G06N 3/0475 | (2023.01) |
| G06N 3/09 | (2023.01) |

(52) U.S. Cl.
CPC ........ *G06F 16/3329* (2019.01); *G06F 16/353* (2019.01); *G06N 3/045* (2023.01); *G06N 3/0475* (2023.01); *G06N 3/09* (2023.01)

(58) Field of Classification Search
None
See application file for complete search history.

(56) References Cited

U.S. PATENT DOCUMENTS

| | | | |
|---|---|---|---|
| 10,095,688 B1* | 10/2018 | Schilling | ............ H04L 51/06 |
| 11,070,879 B2 | 7/2021 | Wu et al. | |
| 11,381,682 B2 | 7/2022 | Matula et al. | |
| 11,769,159 B2* | 9/2023 | Chaudhuri | ........... G06V 10/811 |
| | | | 705/7.29 |

(Continued)

FOREIGN PATENT DOCUMENTS

| | | |
|---|---|---|
| CN | 113076407 A | 7/2021 |
| CN | 114780675 A | 7/2022 |

OTHER PUBLICATIONS

Bao, S. et al. | "PLATO-XL: Exploring the Large-scale Pre-training of Dialogue Generation." arXiv:2109.09519v2 [cs.CL] Oct. 19, 2022, 12 pages.

(Continued)

*Primary Examiner* — Kim T Nguyen
(74) *Attorney, Agent, or Firm* — Amin, Turocy & Watson, LLP

(57) ABSTRACT

Systems and techniques that facilitate empathetic or emotional query response are provided. For example, one or more embodiments described herein can comprise a system, which can comprise a memory that can store computer executable components. The system can also comprise a processor, operably coupled to the memory that can execute the computer executable components stored in memory. The computer executable components can comprise a first machine learning model that generates a first response portion, wherein the first response portion comprises a technical response to the input query, and a second machine learning model that generates a second response portion, wherein the second response portion comprises an empathetic or emotional response to the emotion portion of the input query.

20 Claims, 12 Drawing Sheets

(56) References Cited

U.S. PATENT DOCUMENTS

2022/0237368 A1   7/2022  Tran
2022/0293107 A1   9/2022  Leaman et al.

OTHER PUBLICATIONS

Yuan, B. et al. | "Decentralized Training of Foundation Models in Heterogeneous Environments." arXiv:2206.01288v2 [cs.DC] Jun. 10, 2022, 18 pages.

Bommasani, R. et al. | "On the Opportunities and Risks of Foundation Models." arXiv:2108.07258v3 [cs.LG] Jul. 12, 2022, 214 pages.

Kim, H. et al. | "Prosocialdialog: A Prosocial Backbone for Conversational Agents." arXiv:2205.12688v2 [cs.CL] Oct. 25, 2022, 25 pages.

Github | "P202203173: GPT Powered Empathetic Professional Chatbot in Customer Service using Mixture of Experts." Webpage https://github.ibm.com/IDT-AI-Conversational-QAandMT/IDT-AI-QAandMT-messaging/issues/38, created Aug. 17, 2022, updated Sep. 19, 2022, 3 pages.

Lin, Zh. et al. | "CAiRE: An End-to-End Empathetic Chatbot." Proceedings of the AAAI Conference on Artificial Intelligence, 34(09), 13622-13623, https://doi.org/10.1609/aaai.v34i09.7098, published Apr. 3, 2020, 2 pages.

* cited by examiner

PROMPT BANK 501 — 511

Que: I have waited over 5 working days for a transfer, and I haven't eaten for two days. Where is my xxxx money!!! Ans: We are sorry to hear about this and apologize for any inconvenience you may have. <|endoftext|>
Que: I have been unable to use my account for a week due to an unresolved balance issue after switching bank accounts despite transferring funds immediately. I can't believe it takes a week to resolve transactions? Ans: We understand your concern and thanks for reaching out to us and for bringing this to our attention. <|endoftext|>
Que: You guys are literally the worst bank ever! Ans: This is never the service we intended to provide. What's going on? <|endoftext|>
Que: Just gave me hands down the worst customer service and support I've ever experienced Ans: I can relate to your disappointment and sorry to hear about this. <|endoftext|>
Que: Extremely unhappy with my new card already. Will not activate and when i tried to call cleo was incredibly unhelpful. Ans: Your situation concerns us and we want to make sure you are satisfied. <|endoftext|>

PROMPT BANK 502

Que: I couldnt find an email online. How can i update that to ensure the card gets to me? Ans: We would be happy to look into this for you. <|endoftext|>
Que: I need help settling fraudulent charges. Every channel and process followed and claim still denied. Ans: I am sorry to read this. <|endoftext|>
Que: my online banking passcode has reset itself 4 times over the past 2 days. are you having security issues? Ans: We apologize for the inconvenience. <|endoftext|>
Que: I've been waiting for my new card to come in mail since last wednesday why it take so long? Ans: We are sorry to hear that you still havent received your card. <|endoftext|>
Que: Am i only limited to one instant transfer with the app? Because its not giving me any options when i go back in to do a second one. Ans: I am sorry to hear about this trouble with instant transfers. <|endoftext|>

PROMPT BANK 503

Que: I've had some ups and downs from banking with chase, but lately they've been really good to me. so shout out to you Ans: we appreciate the kind words. if you have questions or concerns, please let us know. <|endoftext|>
Que: Glad they built that new chase bank on mayfield Ans: Thank you for the appreciation and we are just as excited as you are about our new branch! <|endoftext|>
Que: Chase is such a good bank !! i never had an issue with them, they also resolve my problems the same day. grateful Ans: I'm elated we can consistently provide a fantastic experience! <|endoftext|>
Que: Thank you for your commitment to sustainability. Proud to be your customer Ans: Thanks for the shoutout! We are happy for this too. <|endoftext|>
Que: Thank you for your excellent fraud protection. Ans: Thanks for the positive feedback! We love to help you! <|endoftext|>

FIG. 5

TRAINING DATA 601

Que: How do Transactions Made After Business Day Cut-off impact my account? Ans: Certain transactions you make to your checking accounts after the business day cut-off and before midnight are included in the balance we use to pay transactions that night. This process may impact when fees apply to your accounts. The credits can help you avoid overdrafts, returned items and related fees. <|endoftext|>

Que: What information do I need to open a joint account? Ans: You'll need the same information that's needed when opening an individual account, but you'll need it for both applicants. For details, please see the preceding question and answer. Please note that each co-applicant has to sign the signature form. <|endoftext|>

Que: How long will it take to open an account when I apply? Ans: Your application will be processed in 1 to 2 business days. We'll send you either an email or letter letting you know if you are approved for your account. You will receive your account documents via U.S. Mail within 7-10 business days. <|endoftext|>

Que: What is the maximum amount of money I can withdraw at an ATM? Ans: The amount you can withdraw from an ATM is based on several factors, including limits that are set based on your card or account type, availability of funds in your account at the time the withdrawal is requested and in some cases the amount the ATM is capable of dispensing. <|endoftext|>

Que: What is a chip card? Ans: A chip card is a standard-size plastic debit card that contains an embedded microchip as well as the traditional magnetic stripe. The chip encrypts information to help increase data security when making transactions at terminals or ATMs that are chip enabled. Learn more about chip cards <|endoftext|>

FIG. 6

EMPATHETIC QUERY RESPONSE USING MIXTURE OF EXPERTS

BACKGROUND

The subject disclosure relates to machine generated query response, and more specifically to empathetic and emotional query response.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate empathetic and emotional query response.

According to an embodiment, a system can comprise a processor that executes computer executable components stored in memory. The computer executable components comprise a communications component that receives an input query, a filtering component that filters an emotion portion from the input query, a first machine learning model that generates a first response portion, wherein the first response portion comprises a technical response to the filtered input query, a second machine learning model that generates a second response portion, wherein the second response portion comprises an emotional response to the emotion portion of the input query, and a combination component that combines the first response portion and the second response portion into a final response.

According to another embodiment, a computer-implemented method can comprise receiving, by a system operatively coupled to a processor, an input query, filtering, by the system, an emotion portion from the input query, generating, by the system, a first response portion from a first machine learning model, wherein the first response portion comprises a technical response to the filtered input query, generating, by the system, a second response portion from a second machine learning model, wherein the second response portion comprises an emotional response to the emotion portion of the input query, and combining, by the system, the first response portion and the second response portion into a final response.

According to another embodiment, a computer program product comprising a computer readable storage medium having program instructions embodied therewith, the program instructions executable by a processor to cause the processor to receive an input query, filter an emotion portion from the input query, generate a first response portion from a first machine learning model, wherein the first response portion comprises a technical response to the filtered input query, generate a second response portion from a second machine learning model, wherein the second response portion comprises an emotional response to the emotion portion of the input query, and combine the first response portion and the second response portion into a final response.

DESCRIPTION OF THE DRAWINGS

FIG. 5 illustrates example prompts and prompt banks in accordance with one or more embodiments described herein.

FIG. 6 illustrates example training data question-and-answer pairs in accordance with one or more embodiments described herein.

DETAILED DESCRIPTION

Figure 1:
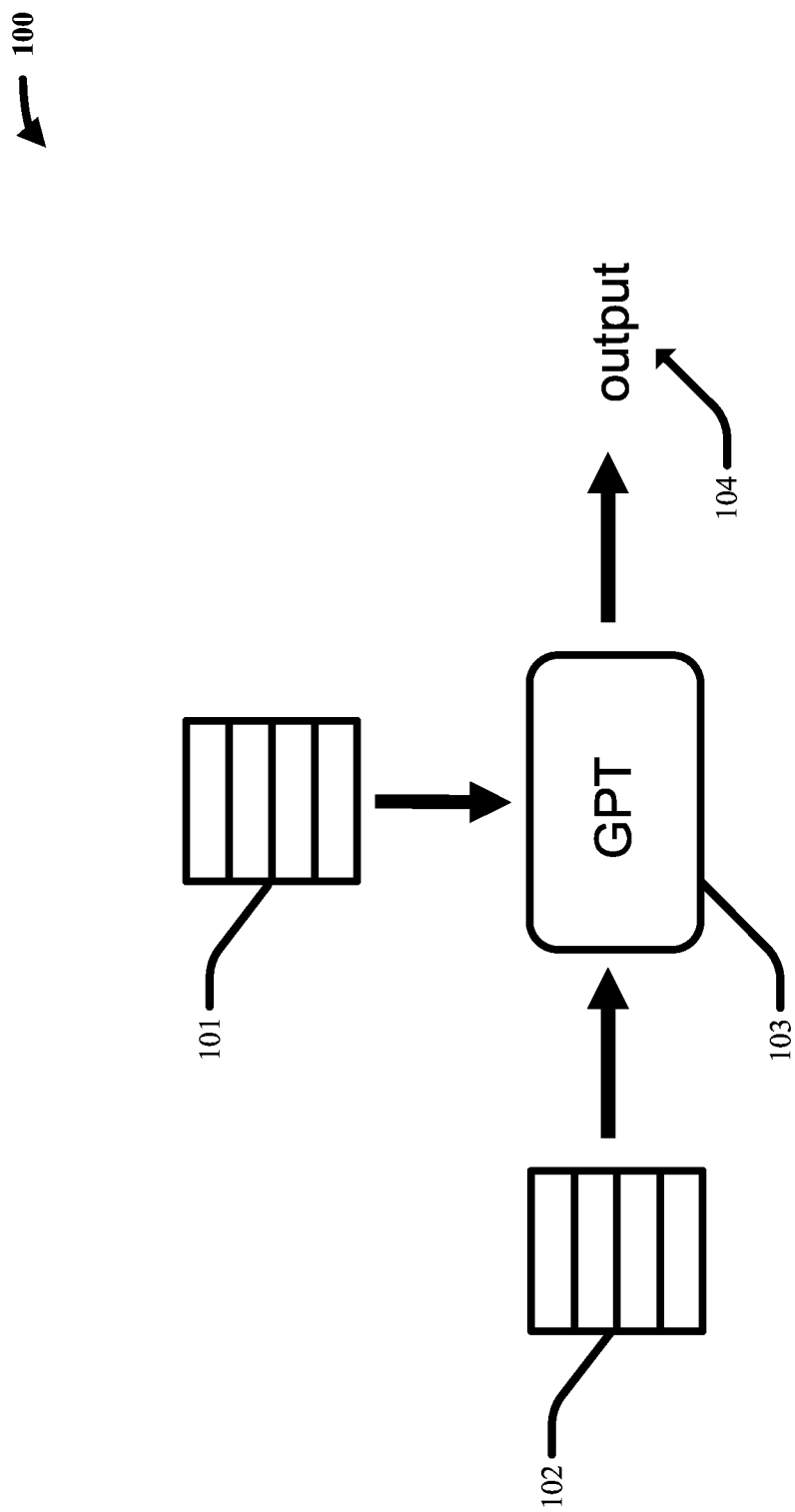
FIG. 1 illustrates a flow diagram of a non-limiting example of an in-context learning process in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

As referenced herein, an "entity" can comprise a client, a user, a computing device, a software application, an agent, a machine learning (ML) model, an artificial intelligence (AI) model, and/or another entity.

As used herein, the terms "machine learning model" and/or "machine learning models" can refer to a computer model that can be used to facilitate one or more machine learning tasks, wherein the computer model can simulate a number of interconnected processing units that can resemble abstract versions of neurons. For example, the one or more machine learning models can be neural network models comprising processing units that can be arranged in a plurality of layers (e.g., one or more input layers, one or more hidden layers, and/or one or more output layers) connected with by varying connection strengths (e.g., which can be commonly referred to within the art as "weights"). Neural network models can learn through learning, wherein data with known outcomes is inputted into the computer model, outputs regarding the data are compared to the known outcomes, and/or the weights of the computer model are autonomous adjusted based on the comparison to replicate the known outcomes. As used herein, the terms "learning data" or "training data" can refer to data and/or data sets used to train one or more machine learning models. As a machine learning model trains (e.g., utilizes more learning data), the computer model can become increasingly accurate; thus, trained machine learning models can accurately analyze data with unknown outcomes, based on lessons learned from learning data, to facilitate one or more machine learning tasks.

Increasingly, machine learning is being utilized in customer service to provide accurate and timely support to customers, for example, machine learning powered online chatbots. Customers often expect empathetic and professional responses from service providers. Machine learning models usually require large amount of training data. However, in real-world practice, the training data which consists of responses that are both empathetic and technically accurate are not easy to collect, and therefore, may not be sufficient to train a machine learning model. In addition, providing empathetic or emotional responses is unrelated to providing accurate technical support. When a single machine learning model is trained to provide a single response that is both empathetic and technically accurate, the training data related to emotional or empathic responses is superfluous to generating technical responses and the training data related to generating technical responses is superfluous to generating accurate emotional responses. Accordingly, the machine learning model may learn incorrect associations between technical portions of the training data and emotional responses, or incorrect associations between emotional portions of the training data and technical responses. These incorrect associations can lead to incorrect or less accurate responses, thereby decreasing customer satisfaction.

In view of these issues, the described subject matter illustrates machine learning systems capable of providing query responses that are both empathetic, and provide relevant technical support by generating, by a first machine learning model, a first response portion to an input query, wherein the first response portion comprises a technical response to the input query, generating, by a second machine learning model, a second response portion, wherein the second response portion comprises an emotional or empathetic response to the input query, and combining the first response portion and the second response portion to generate a final response comprising both technical feedback to the input query, as well as an empathetic or emotional response. By utilizing multiple machine learning models, the different models can be responsible for different portions of the final response. In real-world practice, it is easy to collect sufficient amount of technical response as training data to train a machine learning model. In addition, by utilizing the first machine learning model to generate the technical response to the input query and utilizing the second machine learning model to generate the emotional response to the input query, incorrect associations between emotional responses and technical responses are avoided, thereby increasing accuracy of the responses.

In an embodiment, the first machine learning model can utilize fine-tuning to generate the first response portion. For example, the input query "I cannot activate my card. I am extremely disappointed." can be broken into a technical portion "I cannot activate my card" and an emotion portion "I am extremely disappointed". The emotion portion of the input query can be filtered out to generate a filtered input query comprising a technical question or statement. In this example, the filtered input query is "I cannot activate my card". Based on the technical field of the input query, training data comprising previously resolved customer support requests can be identified. The training data can be utilized to "fine-tune" the first machine learning model. During fine-tuning, the parameters or weights of a final layer of the first machine learning model are adjusted until convergence is achieved. By adjusting the parameters or weights of the final layer of the first machine learning model, as opposed to all layers or earlier layers, complete re-training of the first machine-learning model is prevented, thereby decreasing training time and resources required for training. Once the first machine learning model is fine-tuned, the first machine learning model can generate the first response portion based on the filtered input query. For example, based on the filtered input query "I cannot activate my bank card", the first machine learning model can generate the first response portion "Please send us a direct message with your account number".

In an embodiment, the second machine learning model can utilize in-context learning (also known as prompt learning) to generate the second response portion. For example, an emotion portion of the input query can be classified as belonging to one or more emotion classes of a set of emotions, wherein the one or more emotion classes are associated with respective prompt banks. Returning to the example above, the emotion portion "I am extremely disappointed" can be classified as belonging to an emotion class. A number of random prompts can be selected from a prompt bank associated with the classified emotion. For example, if the input query is classified as "angry", then a number of prompts from an "angry" prompt bank can be selected, wherein the prompts comprise question-and-answer pairs. The second machine learning model can then utilize the number of randomly selected prompts as examples in order to generate an emotional response portion appropriate for the classified emotion of the input query. For example, based on the emotion portion "I am extremely disappointed", the second machine learning model can generate the second response portion "This is not the service we intend to provide. We are sorry to know you are experiencing trouble". As the prompts are used as examples rather than training data, weights or parameters of the second machine learning model are not adjusted.

Once the first response portion and the second response portion are generated, the two response portions can be combined and/or concatenated in order to produce a final response that is both empathetic and offers relevant or accurate technical support. Accordingly, the example first response portion and example second response portion above can be combined to form the final response "This is not the service we intend to provide. We are sorry to know you are experiencing trouble. Please send us a direct message with your account number". As two different machine learning models are utilized to generate different portions of a final response, this mixture of experts (e.g., the first machine learning model and the second machine learning model) only requires a specific type of training dataset to train each machine learning model separately (e.g., only the training data consisting of technical responses is required to train a machine learning model that is responsible for the technical portion as opposed to a single training data consisting of both empathetic and technical response to train a single machine learning model) in fields such as customer service chat bots. In addition, this approach enables faster and/or more accurate query response.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates a block diagram 100 of a non-limiting example of an in-context learning process in accordance with one or more embodiments described herein.

As shown, by diagram 100, a machine learning model such as generative pre-trained transformer model (GPT) 103 can receive prompts 101 and input query 102. GPT models are a form of deep-learning transformer network which apply different weights (e.g., significances) to different parts of an input in order to perform natural language processing. In one or more embodiments, alternative machine learning model examples such as, but not limited to: transformer ("T"), bidirectional encoder representations from transformers (BERTs), perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), Markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), neural turing machine ("NTM"), a combination thereof, and/or the like can be utilized.

In-context learning takes advantage of pre-trained models or previously trained models, such as GPT model 103, to reduce training cost, and thereby reduce the computation cycles and amount of training data called for to adapt a model to a specific task. For example, GPT model 103 is a large language model or AI foundation model that is trained on internet-scale text data and can be adapted to a specific field of use or task. During in-context learning, GPT model 103 can receive prompts 101 and input query 102 as input, wherein the prompts 101 are related to a specific field of use or task. Prompts 101 can comprise examples that GPT model 103 can use to generate an output based on input query 102. For example, as described in greater detail below, prompts 101 can comprise question-and-answer pairs and input query 102 can comprise a question or statement for GPT model 103. GPT model 103 can utilize the prompts 101 as a set of example responses for questions and generate an output 104 to input query 102. By utilizing in-context learning, relatively small prompt sizes can be utilized to adapt GPT model 103 to a specific task, without the high computation cost (e.g., processor cycles and memory use) called for in completely re-training GPT model 103. Furthermore, as the prompts 101 are used as examples rather than as training data, the weights of GPT model 103 are not updated and GPT model 103 can be rapidly adapted to other forms of tasks.

Figure 2:
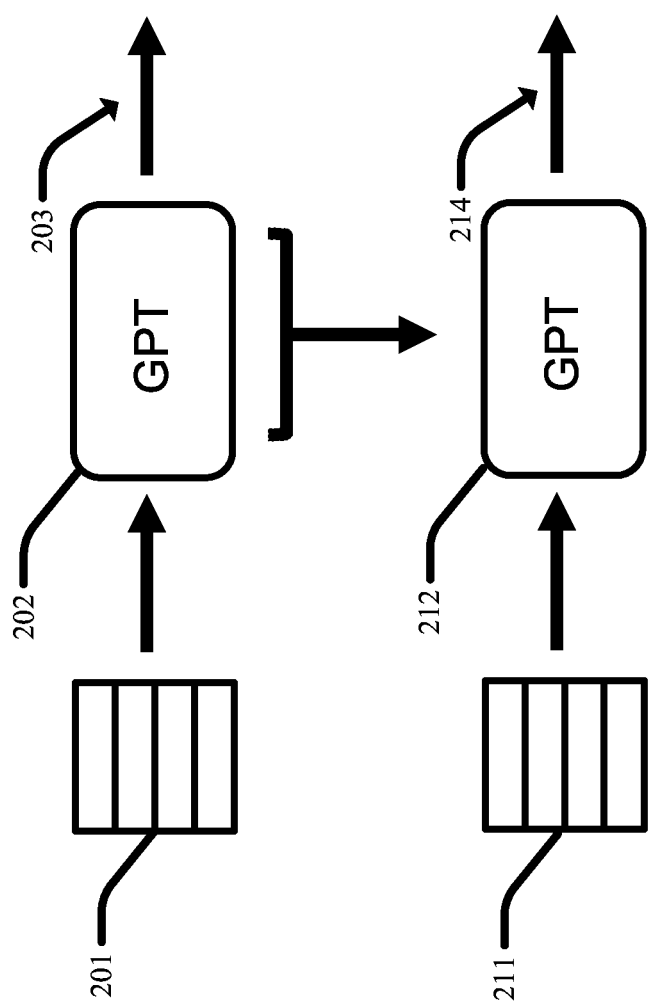
FIG. 2 illustrates a flow diagram of a non-limiting example of fine-tuning in accordance with one or more embodiments described herein.

FIG. 2 illustrates a block diagram 200 of a non-limiting example of fine-tuning in accordance with one or more embodiments described herein.

For some tasks, in-context learning may not provide enough data to effectively adapt a machine learning model to a specific task. Accordingly, fine-tuning may be utilized as opposed to complete retraining of a machine learning model. In fine-tuning, a neural network receives a training data set and then produces an output based on the training data set. Based on a comparison between an expected output and the actual output of the neural network, determined using a loss function, weights or parameters of the neural network can be updated. In complete re-training, weights or parameters at all levels of the neural network are adjusted, which can increase training time and computational cost (e.g., processor cycles and memory use). In contrast, during fine-tuning, weights or parameters in a limited number of layers of the neural network, such as the final layer, output layer or top layer, are adjusted or modified. Accordingly, fine-tuning takes advantage of the prior training of the neural network, while efficiently adapting the neural network to the task embodied by the training data. The fine-tuning cycle can be repeated until the neural network reaches convergence (e.g., the loss between the output of the neural network and the expected output are within a threshold value). As shown by diagram 200, training data 201 can be utilized by GPT model 202 to produce an output 203. Based on the loss between an expected output and output 203, weights of a final layer of GPT model 202 can be adjusted to produce updated GPT model 212. Once updated GPT model 212 has reached convergence with the training data, an input query 211 can be provided to updated GPT model 212 and updated GPT model 212 can produce output 214 based on input query 211.

Figure 3:
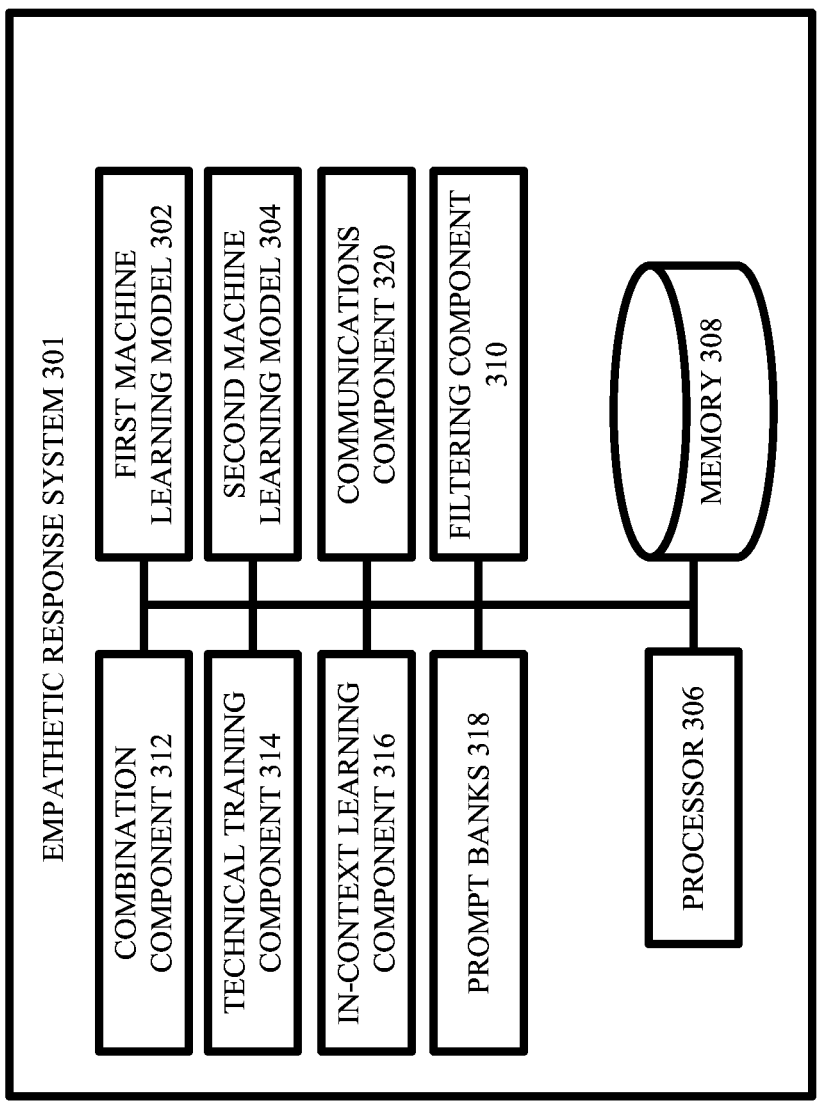
FIG. 3 illustrates a block diagram of an example, non-limiting, system that can facilitate empathetic customer support responses in accordance with one or more embodiments described herein.

FIG. 3 illustrates a block diagram of an example, non-limiting system 301 that can facilitate empathetic customer support responses. Repetitive description of like elements employed in other embodiments described herein is omitted for sake of brevity. Aspects of systems (e.g., system 301 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines, e.g., computers, computing devices, virtual machines, etc. can cause the machines to perform the operations described. System 301 can comprise a first machine learning model 302, a second machine learning model 304, a communications component 320, a filtering component 310, combination component 312, technical training component 314, in-context learning component 316, prompt banks 318, processor 306 and memory 308.

In various embodiments, empathetic response system 301 can comprise a processor 306 (e.g., a computer processing unit, microprocessor) and a computer-readable memory 308 that is operably connected to the processor 306. The memory 308 can store computer-executable instructions which, upon execution by the processor, can cause the processor 306 and/or other components of the empathetic response system 301 (e.g., first machine learning model 302, a second machine learning model 304, a communications component 320, a filtering component 310, combination component 312, technical training component 314, in-context learning component 316 and/or prompt banks 318) to perform one or more acts. In various embodiments, the memory 308 can store computer-executable components (e.g., first machine learning model 302, a second machine learning model 304, a communications component 320, a filtering component 310, combination component 312, technical training component 314, in-context learning component 316, prompt banks 318 and/or additional components), the processor 306 can execute the computer-executable components.

According to some embodiments, the first machine learning model 302, the second machine learning model 304, the filtering component 310, the technical training component 314, and/or the in-context learning component 316 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the first machine learning model 302, the second machine learning model 304, the filtering component 310, the technical training component 314, and/or the in-context learning component 316 can employ principles of probabilistic and decision theoretic inference to determine one or more responses based on information retained in a knowledge source database. In various embodiments, the various components can employ individual and distinct knowledge source databases. Additionally or alternatively, the first machine learning model 302, the second machine learning model 304, the filtering component 310, the technical training component 314, and/or the in-context learning component 316 can rely on predictive models constructed using machine learning and/or automated learning procedures. Logic-centric inference can also be employed separately or in conjunction with probabilistic methods. For example, sequential models, such as Long Short-Term Memory networks (LSTM), can be utilized to map observations about data retained in a knowledge source database to derive a conclusion as to a response to a question or query.

As used herein, the term "inference" refers generally to the process of reasoning about or inferring states of the system, a component, a module, the environment, and/or assessments from one or more observations captured through events, reports, data, and/or through other forms of communication. Inference can be employed to identify a specific context or action, or can generate a probability distribution over states, for example. The inference can be probabilistic. For example, computation of a probability distribution over states of interest can be based on a consideration of data and/or events. The inference can also refer to techniques employed for composing higher-level events from one or more events and/or data. Such inference can result in the construction of new events and/or actions from one or more observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with automatic completion of one or more assessments associated with a target entity through the utilization of various structured and/or unstructured electronic data) can employ various artificial intelligence-based schemes for carrying out various aspects thereof. For example, a process for evaluating one or more parameters of a target entity can be utilized to predict one or more responses to the assessment, without interaction from the target entity, which can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to prognose or infer an action that should be employed to make a determination. The determination can include, but is not limited to whether to select a first assessment instead of a second assessment from an assessment database and/or whether a question presented in the selected assessment is similar to another question in an assessment previously completed. Another example includes whether, in the absence of specific information about the target entity, data from another target entity or a group of target entities can be utilized (which can impact a confidence score). In the case of automatic completion of assessments, for example, attributes can be identification of a target entity based on historical information and the classes can be related answers, related conditions, and/or related diagnoses.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing and recording target entity behavior, by receiving extrinsic information, and so on). For example, SVM's can be configured through a learning phase or a training phase within a classifier constructor and feature selection module. Thus, a classifier(s) can be used to automatically learn and perform a number of functions, including but not limited to, determining according to a defined criteria a relevant assessment based on a given set of characteristics of a target entity. Further to this example, the relevant assessment can be selected from a multitude of assessments. Another function can include determining one or more responses to the assessment in view of information known about the target entity and assigning confidence scores to the responses. The criteria can include, but is not limited to, historical information, similar entities, similar subject matter, and so forth.

Additionally or alternatively, an embodiment scheme (e.g., a rule, a policy, and so on) can be applied to control and/or regulate an embodiment of automatic selection and/or completion of assessments before, during, and/or after a computerized assessment process. In some embodiments, based on a defined criterion, the rules-based embodiment can automatically and/or dynamically interpret how to respond to a particular question and/or one or more questions. In response thereto, the rule-based embodiment can automatically interpret and carry out functions associated with formatting the response or one or more responses based on an electronic format for receipt of the responses by employing a defined and/or programmed rule(s) based on any desired criteria.

In an embodiment, communications component 320 can receive an input query. For example, an input query can be input by an entity into a user input device. The input query can comprise a text statement comprising a technical portion (e.g., a question, a statement of a problem or a request for customer support) and an emotion portion expressing an emotion of the entity. For example, the technical portion may comprise a statement or question such as "I cannot activate my new bank card" and the emotion portion may comprise a statement such as "I am extremely upset with this new card". It should be appreciated that these are merely examples, and the input query can comprise any textual statement or other form of statement converted to text form. For example, an audio input may be converted to a text statement, which is then used as the input query. In some embodiments, communications component 320 can operate as a chat-bot for automated conversational response with an entity. For example, communications component 320 can receive a chat message from an entity, which is used as an input query described in detail below. Once a response to the input query is generated, communications component 320 can send the response to the entity via the chat service utilized to receive the message. Example chat services can include, but are not limited to, cellular messaging, online messaging, social media applications, or other suitable messaging platforms or services.

In an embodiment, filtering component 310 can filter an emotion portion from the input query. For example, given the input query "Why is my card not activated? I am extremely disappointed", the emotion portion can comprise "I am extremely disappointed". In an embodiment, the filtering component 310 can filter the emotion portion based on a stored list of words or phrases defined as expressing an emotion. In another embodiment, filtering component 310 can employ a classifier, such as an SVM, to classify portions of the input query as expressing emotion, similarly, to as described in greater detail below in relation to the in-context learning component 316.

The first machine learning model 302 can generate a first response portion, wherein the first response portion comprises a technical response to the filtered input query. For example, the first machine learning model 302 can receive the technical portion of the input query (e.g., the filtered input query) as input, and can then produce a response (e.g., the first response portion) to the filtered input query. By utilizing the filtered input query, as opposed to the whole input query, superfluous text unrelated to the technical issue the entity is facing is excluded, thereby improving the quality (e.g., accuracy or relevance) of the generated first response portion. In an embodiment, the first machine learning model 302 can comprise a first generative pre-trained transformer (GPT) model. GPT models are deep learning or neural network language models that are pre-trained on a large text corpus to generate text responses to input text prompts and are then adapted to perform specific tasks using additional training data specific to a specific task. In an embodiment, the first response portion can comprise information such as a request for more information on the problem experienced by the entity, answers to a question, instructions on solving an issue, or any textual statement related to addressing a problem faced by the entity. In some embodiments, the first response portion may comprise content such as hyperlinks to websites containing support information, contact information or instructions for solving an issue.

In an embodiment, technical training component 314 can utilize fine-tuning training, as described above in reference to FIG. 2, to adapt the first GPT model to generate the first response portion. For example, the technical training component 314 can collect data of completed customer service requests. In an embodiment this data can be collected from the organization utilizing the empathetic response system 301 based on the field of customer support the empathetic response system 301 is utilized in. For example, if a financial institution is deploying empathetic response system 301, data from completed customer service requests of the financial institution or completed customer service requests of other financial institutions can be collected. In an embodiment, this data can be collected from records kept by the organization utilizing the empathetic response system 301, from publicly available data (e.g., from the internet or social media), or from other sources. In a further embodiment, the data of completed customer service requests can be a database of completed customer service requests curated or prepared by an entity.

The technical training component 314 can then transform the data of completed customer support requests into question-and-answer pairs, wherein the question is a question from a customer or entity and the answer is a response provided by customer support. Examples of question-and-answer pairs are provided in FIG. 6. The technical training component 314 can utilize the question-and-answer pairs as training data to re-train one or more layers of the first GPT model to output responses to customer support requests. For example, the first GPT model may be trained (e.g., parameters and weights of neural network layers adjusted) until the first GPT model reaches convergence. In an embodiment, the technical training component 314 can fine-tune the first GPT model rather than completely retrain the first GPT model. During fine-tuning, adjustment of model parameters or weights can be limited to a select number of layers of a neural network or to specific layers of a neural network, such as a GPT model. For example, the technical training component 314 can utilize the question-and-answer pairs to adjust and/or modify the parameters and/or weights of the final or top layer of the first GPT model, without adjusting the parameters and/or weights of other layers. Once the first GPT model is fine-tuned by the technical training component 314, the first GPT model can output the first response portion using the filtered input query as input.

The second machine learning model 304 can generate a second response portion, wherein the second response portion comprises an emotional response to the emotion portion of the input query. For example, the second machine learning model 304 can receive the input query, and can then produce a response (e.g., the second response portion) to the input query. In an embodiment, the second machine learning model 304 can comprise a second GPT model, wherein the second GPT model generates an emotional or empathetic response (e.g., the second response portion) to the input query.

In an embodiment, the in-context learning component 316 can utilize in-context learning, as described above in FIG. 1, to adapt the second GPT model to generate the second response portion. For example, the in-context learning component 316 can classify the input query into one or more emotion classes. For example, the one or more emotion classes can comprise an angry class, a disappointed class, and a grateful class. It should be appreciated that use of any number of emotion classes and/or any granularity of emotion classes is envisioned. In an embodiment, the in-context learning component 316 can classify the input query based on a sentiment label and a confidence score. For example, given the three emotion classes of angry, disappointed and grateful, the in-context learning component 316 can label (e.g., classify) the input query as a negative sentiment or a positive sentiment and generate a confidence score for the label. Accordingly, if the input query is labeled as negative with a confidence score below a threshold value, the in-context learning component 316 can classify the input query as disappointed and if the input query is labeled as negative with a confidence score above or equal to the threshold value, the in-context learning component 316 can classify the input query as angry. If the in-context learning component 316 labels the input query as positive, the in-context learning component 316 can classify the input query as grateful. While the above examples describe the use of two labels and three emotion classes, it should be appreciated that use of any number of labels, emotion classes and confidence score thresholds, or use of other suitable classification schemes or techniques, is envisioned.

Prompt banks 318 can comprise one or more prompt banks corresponding to the one or more emotion classes. For example, given the emotion classes angry, disappointed, and grateful, prompt banks 318 can comprise an angry prompt bank, a disappointed prompt bank, and a grateful prompt bank. The one or more prompt banks 318 can comprise prompts comprising a question related to an emotion class and customer service answer responding to the emotion class. For example, the angry prompt bank can comprise prompts in which the question has an angry tone, and the answer is an empathetic or emotional response based on the angry tone. Examples, of prompts are provided in FIG. 5. Based on the classified emotion, the in-context learning component 316 can select a number of prompts from the corresponding prompt bank of the one or more prompt banks 318. For example, if the input query is classified as angry, a number of random prompts can be selected from the angry prompt bank. Similarly, if the input query is classified as grateful, a number of random prompts can be selected from the grateful prompt bank. In an embodiment, the number of selected prompts can comprise between one and twenty.

In-context learning component 316 can then concatenate the input query with the selected prompts. For example, the prompts and the input query can be concatenated as series of question-and-answer pairs, wherein the answer for the input query is blank. The second GPT model can receive the concatenated prompts and input query as an input. Using the prompts as examples, the second GPT model can generate an empathetic or emotional response (e.g., the second response portion) based on the classified emotion of the input query. The combination component 312 can receive the first response portion and the second response portion and can combine or concatenate the first response portion and the second response portion to generate a final response. For example, given the first response portion "Please send us a direct message with your email and a screen shot of the transaction" and a second response portion "This is not the experience we intend to provide, and we are sorry to know you are experiencing trouble" the combination component 312 can generate the final output "This is not the experience we intend to provide, and we are sorry to know you are experiencing trouble. Please send us a direct message with your email and a screen shot of the transaction". It should be appreciated that the first response portion and the second response portion can be combined and/or concatenated in any form appropriate. In an embodiment the communications component 320 can send the final response back to the entity.

Figure 4:
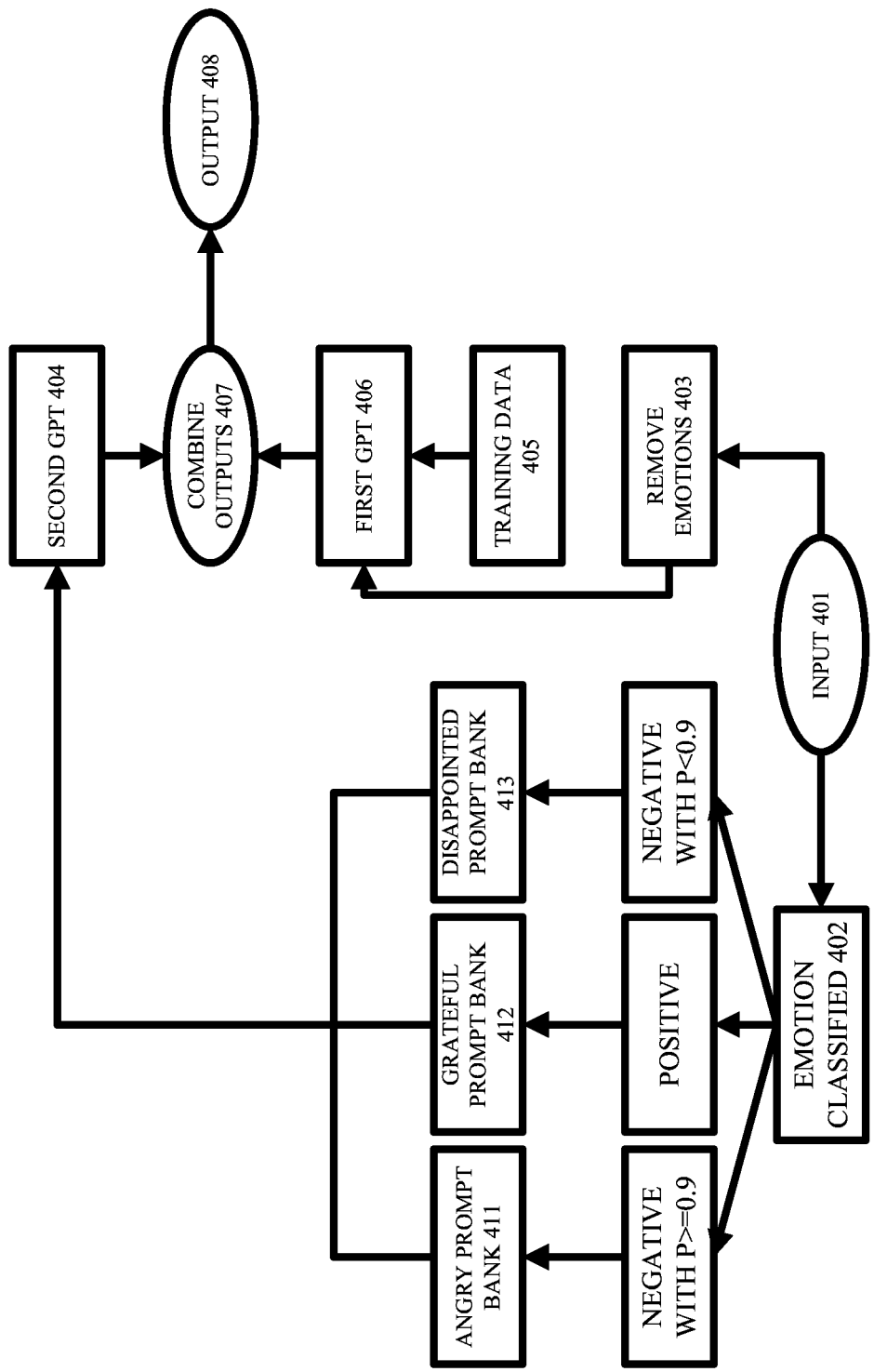
FIG. 4 illustrates a flow diagram of an example, non-limiting, computer implemented method of empathetic response generation in accordance with one or more embodiments described herein.

FIG. 4 illustrates a flow diagram of an example, non-limiting, computer implemented method 400 of empathetic response generation in accordance with one or more embodiments described herein. Communications component 320 receives input query 401 from an entity. At 402, in-context learning component 316 classifies the input query. In this example, the input query can be classified as grateful based on a positive emotion label, as angry based on a negative emotion label with a confidence score greater or equal to 0.9, or as disappointed based on a negative emotion label with a confidence score less than 0.9. As described above in reference to FIG. 3, use of any number of emotion labels, emotion classes and/or confidence score thresholds is envisioned. Based on the classified emotion, in-context learning component 316 selects a number of random prompts from the corresponding prompt bank. For example, if the input query is classified as angry, prompts from angry prompt bank 411 can be selected, if the input query is classified as grateful, prompts from grateful prompt bank 412 can be selected, and if the input query is classified as disappointed, prompts from disappointed prompt bank 413 can be selected. The selected prompts and input query are then used by second GPT model 404 to generate the second response portion. At 403, filtering component 310 filters or removes emotions from the input query to generate a filtered input. Technical training component 314 then utilizes training data 405 to fine-tune the first GPT model 406. The first GPT model 406 then generates the first response portion based on the filtered input query and combination component 312 combines the first response portion and the second response portion at 407 to generate final output 408.

FIG. 5 illustrates example prompts and prompt banks in accordance with one or more embodiments described herein. As shown, three prompt banks, prompt bank 501, prompt bank 502 and prompt bank 503 are illustrated. In this example, prompt bank 501 comprises prompts related to an angry emotion class, prompt bank 502 comprises prompts related to a disappointed emotion class, and prompt bank 503 comprises prompts related to a grateful emotion class. It should be appreciated that use of any number of emotion classes and corresponding prompt banks is envisioned. As shown by example prompt 511, the prompts can comprise an example question portion from an entity or customer and an example answer portion in response to the example question.

FIG. 6 illustrates example training data question and answer pairs in accordance with one or more embodiments described herein. As shown, training data 601 comprises various pairs of example customer questions and customer support answers related to the example customer questions. As described above in detail in reference to FIG. 3, the technical training component 314 can utilize training data, such as example training data 601 to fine-tune the first GPT model.

Figure 7:
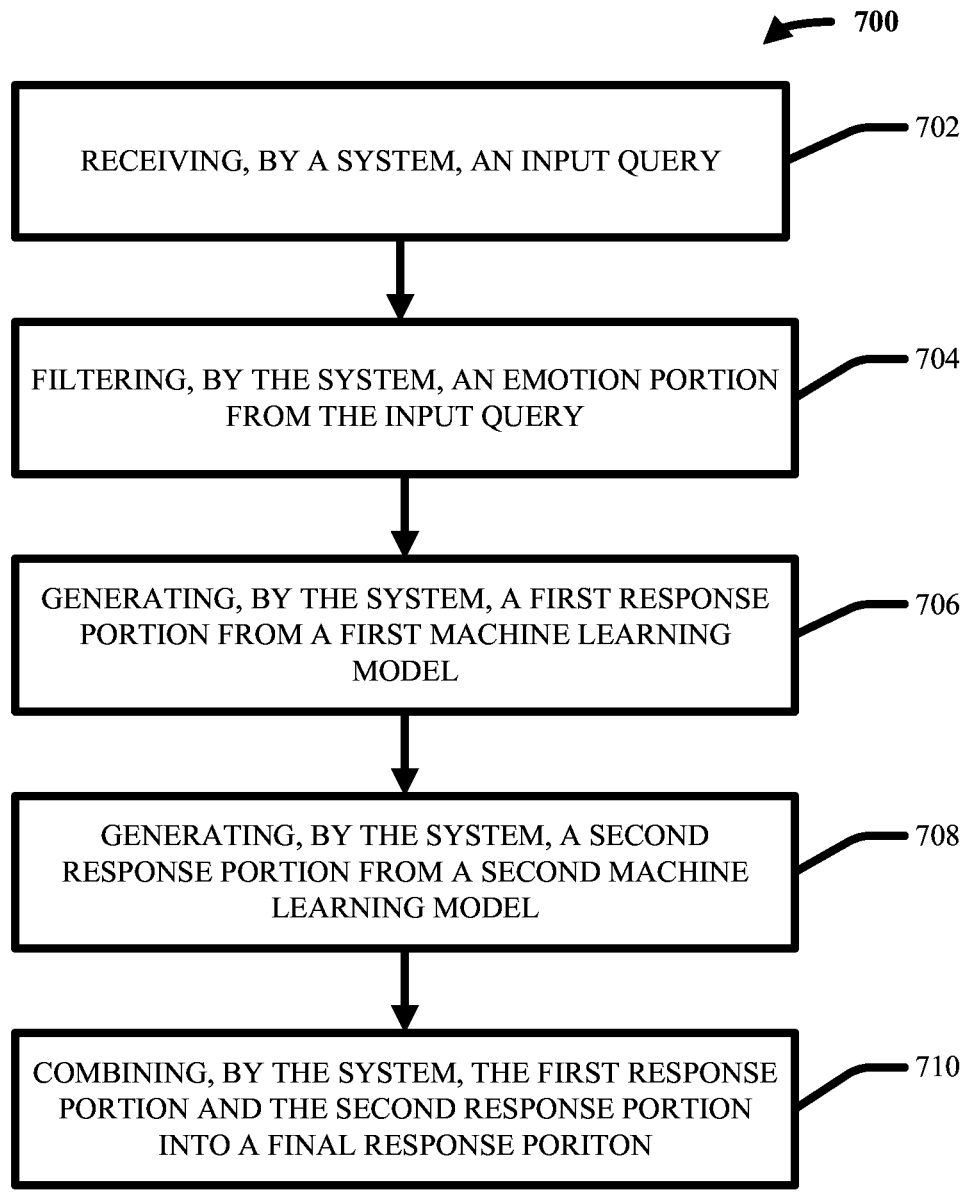
FIG. 7 illustrates a flow diagram of an example, non-limiting, computer implemented method that can facilitate empathetic query response in accordance with one or more embodiments described herein.

FIG. 7 illustrates a flow diagram of an example, non-limiting, computer implemented method 700 that can facilitate empathetic query response in accordance with one or more embodiments described herein.

At 702, a system (e.g., empathetic response system 301 and/or communications component 320) operatively coupled to a processor (e.g., processor 306), receives an input query. For example, the input query can comprise a customer support request, question or statement from an entity.

At 704, the system (e.g., empathetic response system 301 and/or filtering component 310), filters an emotion portion from the input query. For example, as described above in reference to FIG. 3, filtering component 310 can filter one or more words or phrases from the input query to generate the filtered query.

At 706, the system (e.g., empathetic response system 301 and/or first machine learning model 302), generates a first response portion, wherein the first response portion comprises a technical response to the filtered input query. For example, as described above in greater detail in reference to FIG. 3 and below in reference to FIG. 8, technical training component 314 can fine-tune a first GPT model, and the first GPT model can then utilize the filtered input query to generate the first response portion.

At 708, the system (e.g., empathetic response system 301 and/or second machine learning model 304), generates a second response portion, wherein the second response portion comprises an emotional response to the emotion portion of the input query. For example, as described in greater detail above in reference to FIG. 3 and below in greater detail in reference to FIG. 9, in-context learning component 316 can classify the input query into an emotion class and select a number of random prompts from a prompt bank associated with the classified emotion class. The second GPT model can then use the prompts and the input query as input to generate the second response portion.

At 710, the system, (e.g., empathetic response system 301 and/or combination component 312), combines the first response portion and the second response portion to generate a final response.

Figure 8:
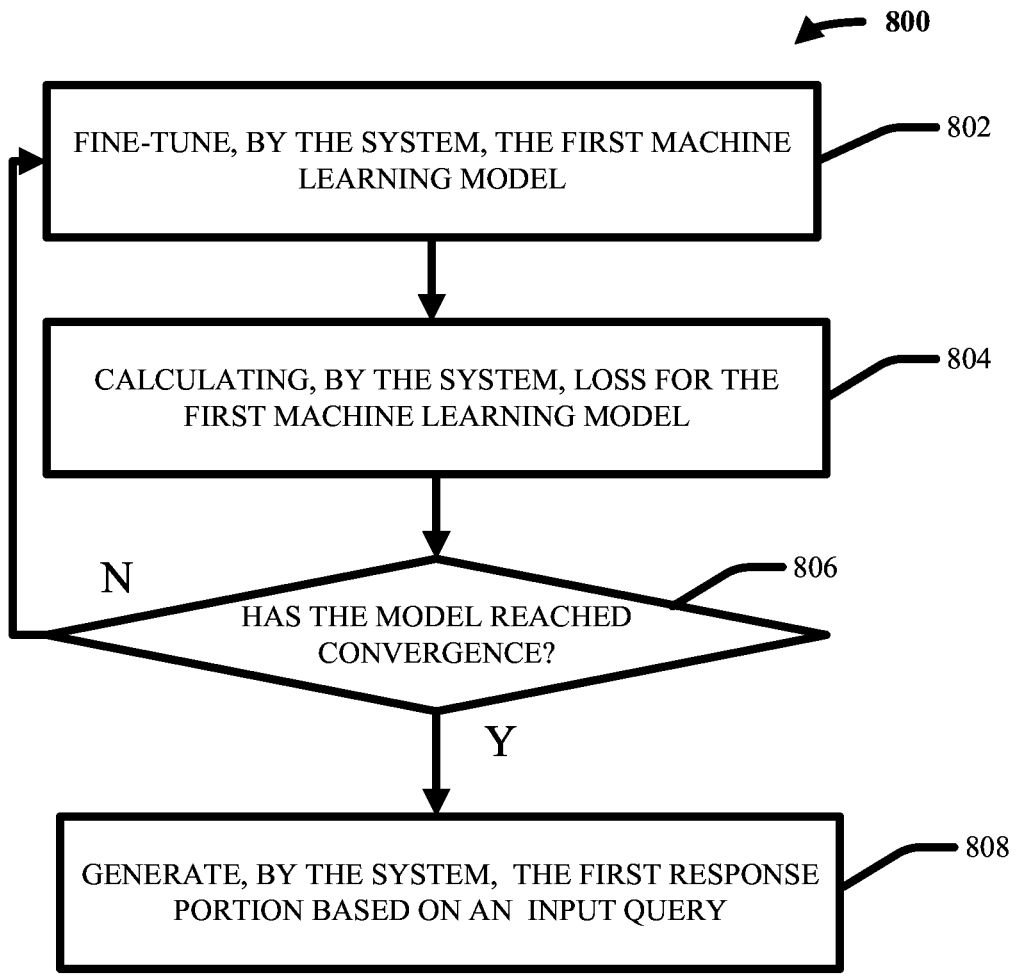
FIG. 8 illustrates a flow diagram of an example, non-limiting, computer implemented method that can facilitate fine-tuning of a machine learning model in accordance with one or more embodiments described herein.

FIG. 8 illustrates a flow diagram of an example, non-limiting, computer implemented method 800 that can facilitate fine-tuning of a machine learning model in accordance with one or more embodiments described herein.

At 802, a system (e.g., empathetic response system 301 and/or technical training component 314) operatively coupled to a processor (e.g., processor 306), fine-tunes a first machine learning model (e.g., first machine learning model 302). For example, as described above in reference to FIGS. 2, 3 and 4, technical training component 314 can transmit training data comprising question-and-answer pairs to first machine learning model 302. Based on the outputs from the training data, technical training component 314 can update one or more weights or parameters in a layer of first machine learning model 302.

At 804, the system (e.g., empathetic response system 301 and/or technical training component 314), calculates loss for the first machine learning model (e.g., first machine learning model 302). For example, as described in greater detail above in reference to FIGS. 2, 3 and 4, loss between an expected output from the first machine learning model 302 and the actual output produced by the first machine learning model 302 based on the training data can be calculated using a loss function. In various embodiments, various loss functions such as log loss, cross-entropy loss, mean-squared loss, likelihood loss, or another form of loss function may be utilized.

At 806, the system (e.g., empathetic response system 301 and/or technical training component 314), determines if the first machine learning model (e.g., first machine learning model 302) has reached convergence. Convergence can be defined as when the loss calculated at step 804 is within a numerical threshold of an intended value. For example, if the loss is within the numerical threshold of the intended value, method 800 can proceed to step 808. If the loss is not within the numerical threshold of the intended value, method 800 can return to step 802 and the fine-tuning process can be repeated to continue to update one or more parameter and/or weights of the first machine learning model 302.

At 808, the system, (e.g., empathetic response system 301 and/or first machine learning model 302), generates a first response portion based on an input query, wherein the first response portion comprises a technical response to the input query. For example, once the first machine learning model 302 has reached convergence, the first machine learning model 302 can receive an input query and generate a first response portion to the input query, as described in greater detail above in reference to FIGS. 3 and 4 above.

Figure 9:
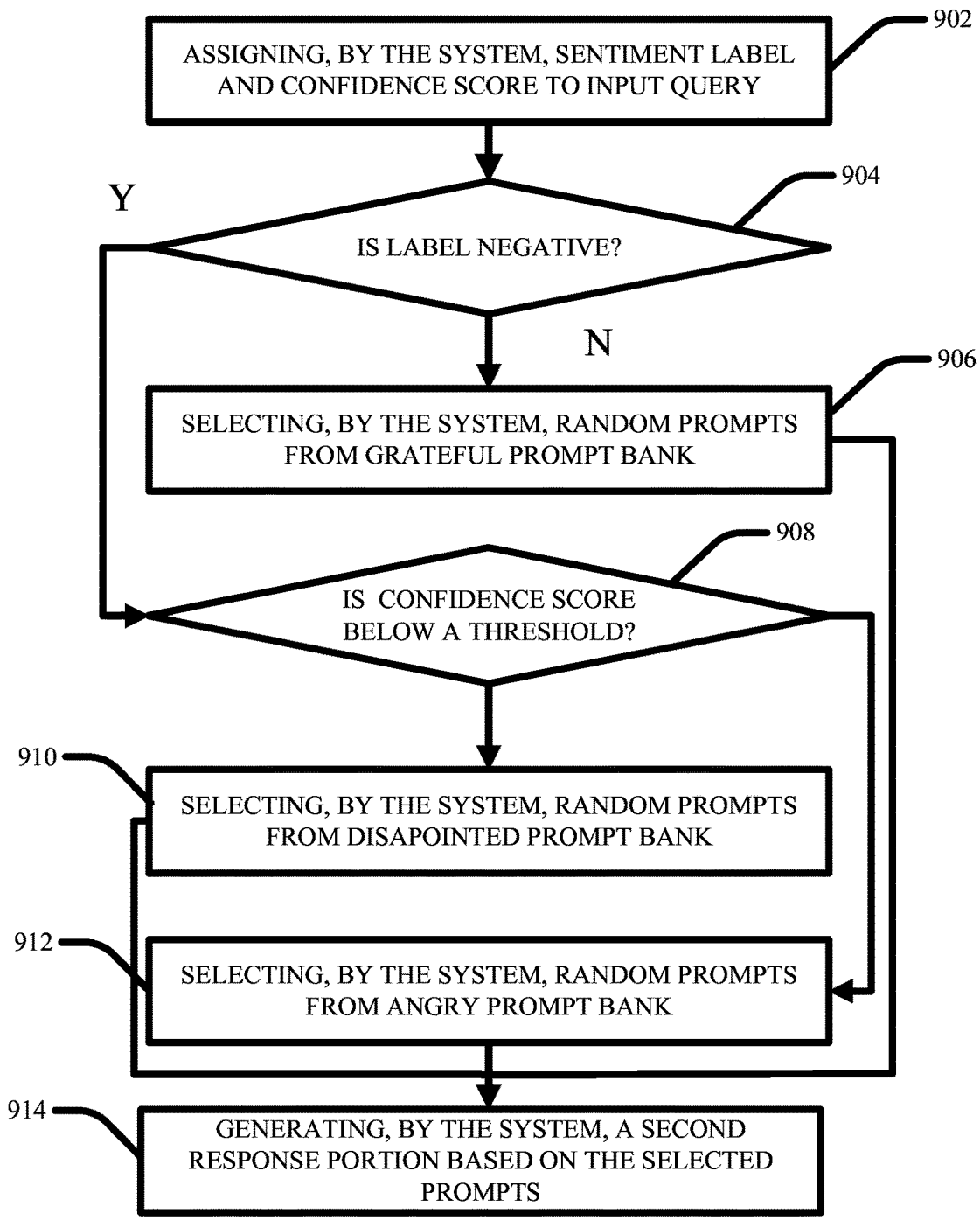
FIG. 9 illustrates a flow diagram of an example, non-limiting, computer implemented method that can facilitate in-context learning of a machine learning model in accordance with one or more embodiments described herein.

FIG. 9 illustrates a flow diagram of an example, non-limiting, computer implemented method 900 that can facilitate in-context learning of a machine learning model in accordance with one or more embodiments described herein.

At 902, a system (e.g., empathetic response system 301 and/or in-context learning component 316) operatively coupled to a processor (e.g., processor 306), assigns a sentiment label and confidence score to an input query. For example, as described above in reference to FIGS. 3 and 4, in-context learning component 316 can categorize an input query as a negative sentiment label or a positive sentiment label and provide a confidence score related to the label.

At 904, the system (e.g., empathetic response system 301 and/or in-context learning component 316), determines whether the sentiment label is negative or positive. If the sentiment label is not negative (e.g., positive) method 900 can proceed to step 906. If the sentiment label is negative, method 900 can proceed to step 908.

At 906, the system, (e.g., empathetic response system 301 and/or in-context learning component 316), selects random prompts from a grateful prompt bank (e.g., prompt banks 318 and/or grateful prompt bank 412). For example, as described above in reference to FIGS. 3, 4 and 5, a number of random prompts can be selected from a prompt bank corresponding to an emotion class of an emotion portion of the input query. From step 906, method 900 can proceed to step 914.

At 908, the system (e.g., empathetic response system 301 and/or in-context learning component 316), determines whether the confidence score related to the negative sentiment label is below a threshold. For example, as described above in reference to FIGS. 3 and 4, if the confidence score associated with the negative sentiment label of an input query is below of threshold, the in-context learning component 316 can classify the input query as belonging to a disappointed emotion class and if the confidence score is equal to or greater than the threshold value, the in-context learning component 316 can classify the input query as belonging to an angry emotion class. If the in-context learning component 316 classifies the input query as disappointed, method 900 can proceed to step 910 of method 900 and if the in-context learning component 316 classifies the input query as angry, method 900 can proceed to step 912 of method 900.

At 910, the system, (e.g., empathetic response system 301 and/or in-context learning component 316), selects random prompts from a disappointed prompt bank (e.g., prompt banks 318 and/or disappointed prompt bank 413). For example, as described above in reference to FIGS. 3, 4 and 5, a number of random prompts can be selected from a prompt bank corresponding to an emotion class of an emotion portion of the input query. From step 910, method 900 can proceed to step 914.

At 912, the system, (e.g., empathetic response system 301 and/or in-context learning component 316), selects random prompts from an angry prompt bank (e.g., prompt banks 318 and/or angry prompt bank 411). For example, as described above in reference to FIGS. 3, 4 and 5, a number of random prompts can be selected from a prompt bank corresponding to an emotion class of an emotion portion of the input query. From step 912, method 900 can proceed to step 914.

At 914, the system (e.g., empathetic response system 301 and/or second machine learning model 304), generates a second response portion, wherein the second response portion comprises an emotional response to the emotion portion of the input query. For example, as described above in reference to FIGS. 1, 3 and 4, the second machine learning model 304 can use the prompts selected at either step 906, 910 or 912 and the input query to generate the second response portion. By utilizing prompts based on the classified emotion of the input query, the selected prompts will comprise examples of answers of the same emotion class, allowing for the second machine learning model 304 to utilize the selected prompts as examples.

Figure 10:
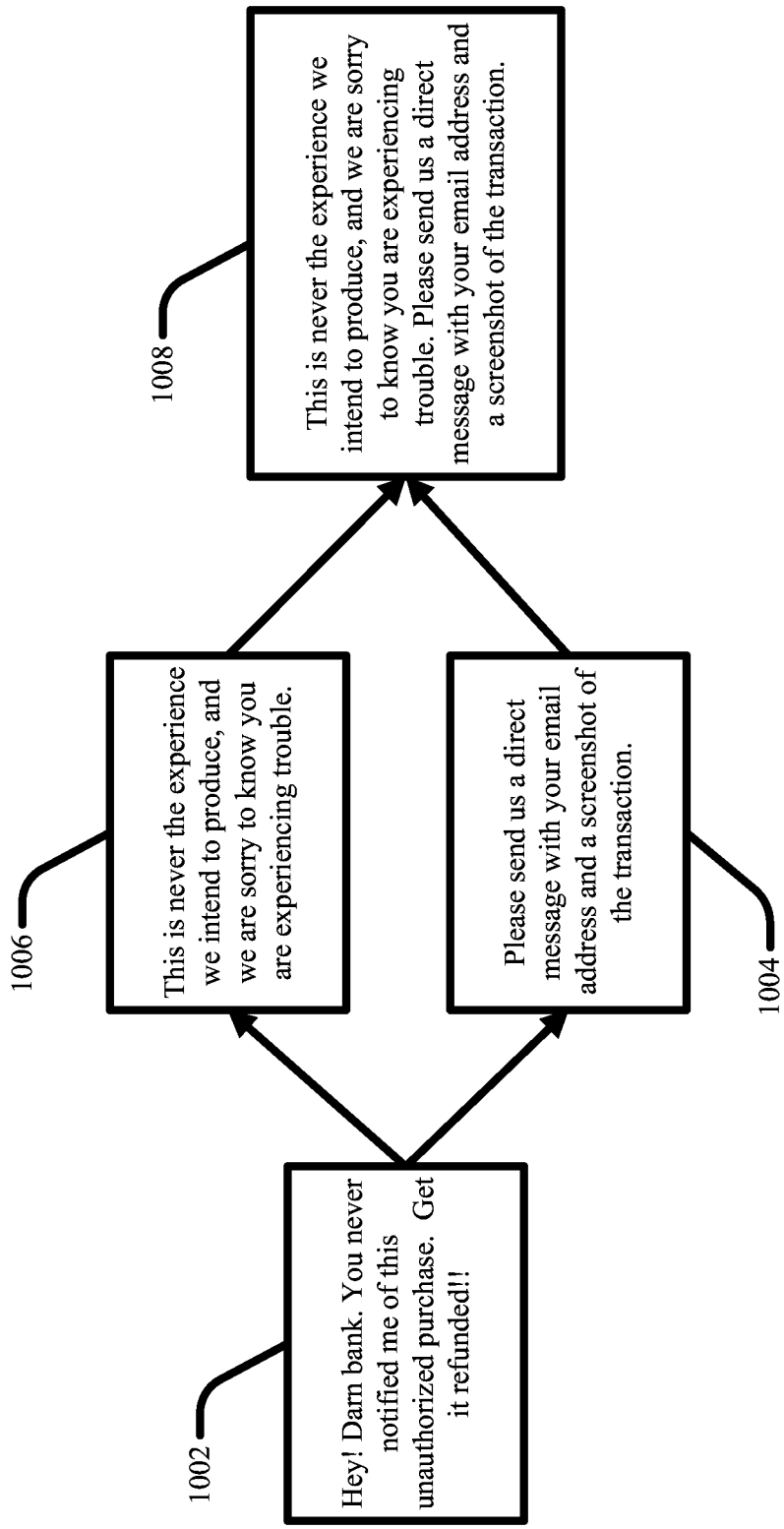
FIG. 10 illustrates examples of an input query, generated first response portion, generated second response portion, and a final response in accordance with one or more embodiments described herein.

FIG. 10 illustrates examples of an input query, generated first response portion, generated second response portion, and a final response in accordance with one or more embodiments described herein. As shown, input query 1002 can be input to empathetic response system 301. As described above in reference to FIGS. 3, 4 and 8, the first machine learning model 302 can generate first response portion 1004 based on input query 1002. As described above in reference to FIGS. 3, 4 and 9, the second machine learning model 304 can generate the second response portion 1006 based on input query 1002. Combination component 312 can then combine the first response portion 1004 and the second response portion 1006 to generate the final response 1008.

Empathetic response system 301 can provide technological improvements to systems, devices, components, operation steps, and/or processing steps associated with query response and chatbots. For example, empathetic response system 301 can utilize separate machine learning models to generate portions of a query response, reducing the efforts of collecting training data which must cover all the portions and preventing different portions of an input query from negatively impacting performance of response generation.

Empathetic response system 301 can provide technical improvements to a processing unit associated with empathetic response system 301. For example, by utilizing two separate machine learning models, the efforts of collecting training data which must cover all the portions are reduced. In addition, the computational cost of training (e.g., the amount of processor cycles) is decreased as the separate machine learning models can be adapted individually, preventing the adaption or fine-tuning for one task of a machine learning model from impacting adaption for a second task. Further, by utilizing fine-tuning to adapt the first machine learning model 302, as opposed to full re-training, the number of parameters and/or weights adjusted is decreased, thereby reducing the workload of a processing unit (e.g., processor 306) that is employed to execute routines (e.g., instructions and/or processing threads) involved in adapting the first machine learning model 302. In this example, by reducing the workload of such a processing unit (e.g., processor 306), empathetic response system 301 can thereby facilitate improved performance, improved efficiency, and/or reduced computational cost associated with such a processing unit. Further, by utilizing in-context learning to adapt the second machine learning model 304, empathetic response system 301 eliminates the large training data sets that would otherwise be utilized to retrain the second machine learning model 304, thereby decreasing the workload of a memory unit (e.g., memory 308), decreasing network traffic, improving network speed, or otherwise enabling empathetic response system 301 to operate over networks with reduced bandwidth.

A practical application of empathetic response system 301 is that it allows for query response utilizing a reduced amount of computing and/or network resources, in comparison to other methods. In addition, it allows for query response utilizing machine learning models that can be separately adapted or trained on training data which covers different portions. Allowing for easier collection of training data.

The computer processing systems, computer-implemented methods, apparatus and/or computer program products employ hardware and/or software to solve problems that are highly technical in nature (e.g., fine-tuning machine learning models), that are not abstract and cannot be performed as a set of mental acts by a human. For example, an individual, or even multiple individuals cannot readily sample a machine learning model at various inputs, compare the outputs to expected outputs, and update weights and/or parameters of the machine learning models.

Figure 11:
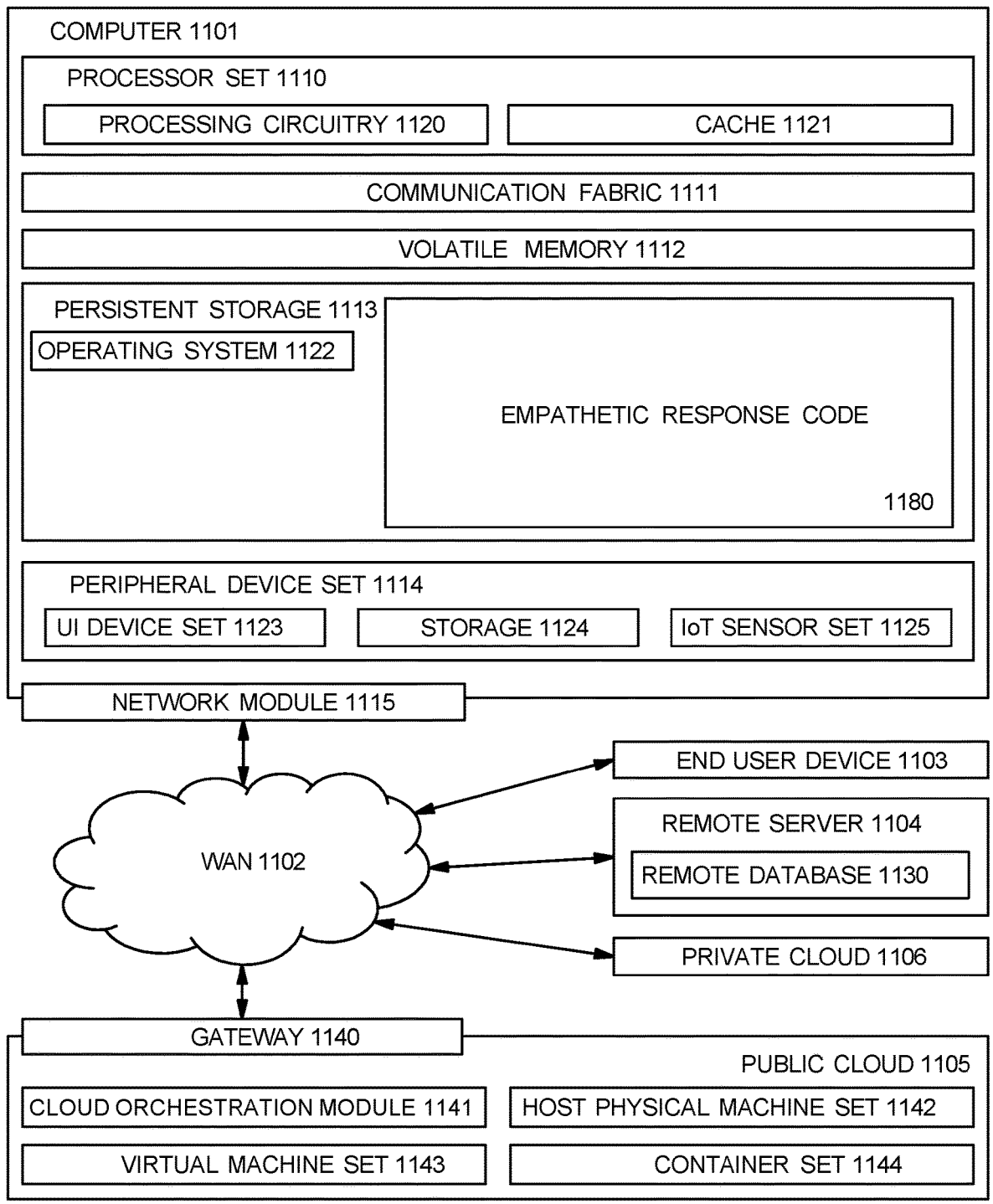
FIG. 11 illustrates an example, non-limiting environment for the execution of at least some of the computer code in accordance with one or more embodiments described herein.

FIG. 11 and the following discussion are intended to provide a brief, general description of a suitable computing environment 1100 in which one or more embodiments described herein at FIGS. 1-10 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1100 contains an example of an environment for the execution of at least some of the computer code involved in performing the inventive methods, such as translation of an original source code based on a configuration of a target system by the empathetic response code block 1180. In addition to block 1180, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1180, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method can be distributed among multiple computers and/or between multiple locations. On the other hand, in this presentation of computing environment 1100, detailed discussion is focused on a single computer, specifically computer 1101, to keep the presentation as simple as possible. Computer 1101 can be located in a cloud, even though it is not shown in a cloud in FIG. 1. On the other hand, computer 1101 is not required to be in a cloud except to any extent as can be affirmatively indicated.

PROCESSOR SET 1110 includes one, or more, computer processors of any type now known or to be developed in the future. Processing circuitry 1120 can be distributed over multiple packages, for example, multiple, coordinated integrated circuit chips. Processing circuitry 1120 can implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set can be located "off chip." In some computing environments, processor set 1110 can be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods can be stored in block 1180 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory can be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 can be a read only memory (ROM), but typically at least a portion of the persistent storage allows writing of data, deletion of data and re-writing of data. Some familiar forms of persistent storage include magnetic disks and solid-state storage devices. Operating system 1122 can take several forms, such as various known proprietary operating systems or open-source Portable Operating System Interface type operating systems that employ a kernel. The code included in block 1180 typically includes at least some of the computer code involved in performing the inventive methods.

PERIPHERAL DEVICE SET 1114 includes the set of peripheral devices of computer 1101. Data communication connections between the peripheral devices and the other components of computer 1101 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 can include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 can be persistent and/or volatile. In some embodiments, storage 1124 can take the form of a quantum computing storage device for storing data in the form of qubits. In embodiments where computer 1101 is required to have a large amount of storage (for example, where computer 1101 locally stores and manages a large database) then this storage can be provided by peripheral storage devices designed for storing large amounts of data, such as a storage area network (SAN) that is shared by multiple, geographically distributed computers. IoT sensor set 1125 is made up of sensors that can be used in Internet of Things applications. For example, one sensor can be a thermometer and another sensor can be a motion detector.

NETWORK MODULE 1115 is the collection of computer software, hardware, and firmware that allows computer 1101 to communicate with other computers through WAN 1102. Network module 1115 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101) and can take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 can be a client device, such as thin client, heavy client, mainframe computer and/or desktop computer.

REMOTE SERVER 1104 is any computer system that serves at least some data and/or functionality to computer 1101. Remote server 1104 can be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data can be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs can be stored as images and can be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware and firmware allowing public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Figure 12:
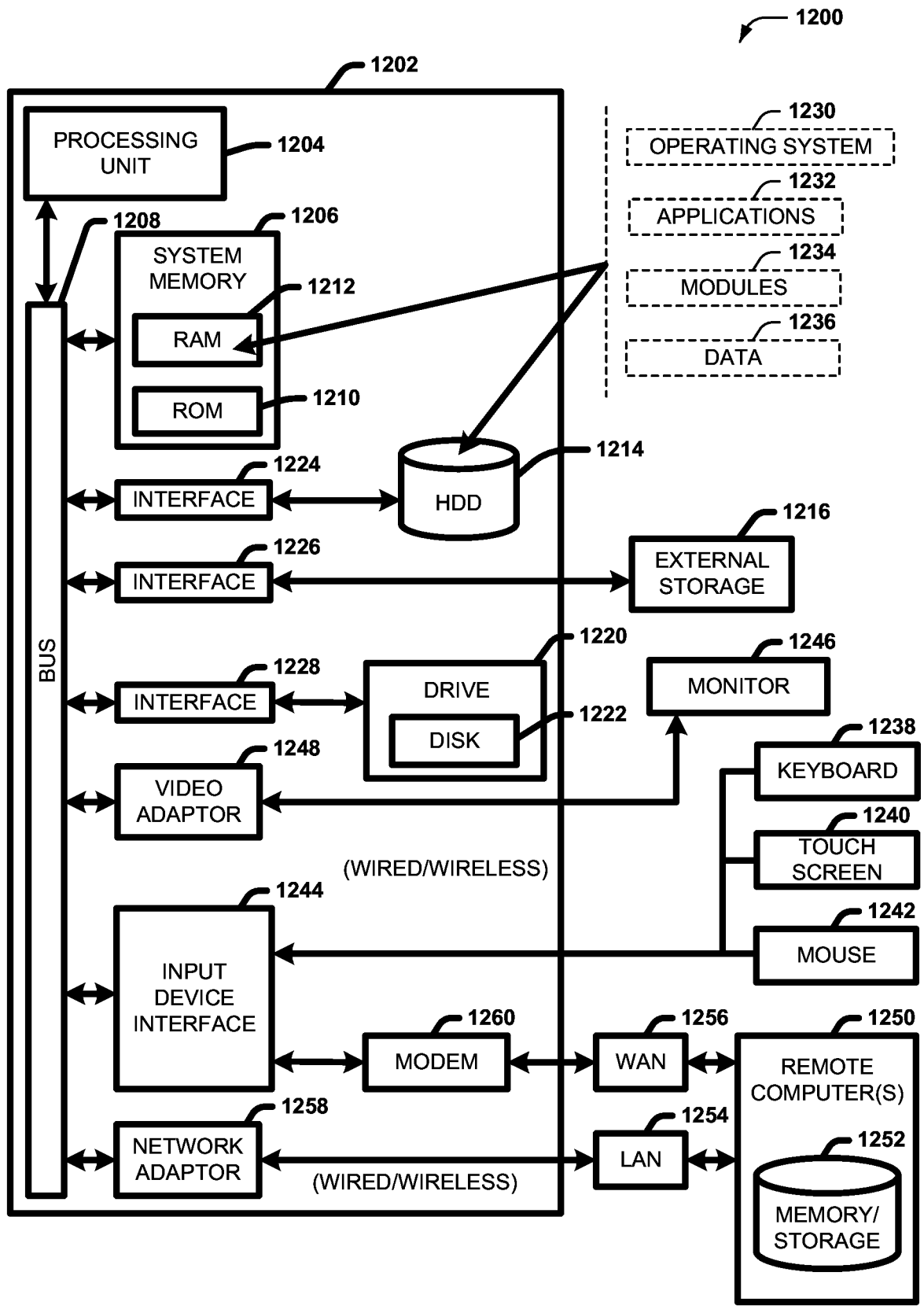
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and a drive 1220, e.g., such as a solid state drive, an optical disk drive, which can read or write from a disk 1222, such as a CD-ROM disc, a DVD, a BD, etc. Alternatively, where a solid state drive is involved, disk 1222 would not be included, unless separate. While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The interface 1224 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1294 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above, such as but not limited to a network virtual machine providing one or more aspects of storage or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A computer-implemented method comprising:
    receiving, by a system operatively coupled to a processor, an input query comprising an emotion portion and a technical portion;
    generating, by the system, a filtered input query by removing the emotion portion from the input query;
    generating, by the system, using the filtered input query and a first machine learning model trained using training data having emotion portions removed, a first response portion that comprises only a technical response to the technical portion of the filtered input query;
    generating, by the system, using the input query and a second machine learning model that employs in-context learning based on an emotion classification of the emotion portion, a second response portion that comprises only an emotional response to the emotion portion of the input query; and
    combining, by the system, the first response portion and the second response portion into a final response.

2. The computer-implemented method of claim 1, wherein the first machine learning model comprises a first generative pre-trained transformer (GPT) model that utilizes fine-tuning, and the second machine learning model comprises a second GPT model that utilizes the in-context learning.

3. The computer-implemented method of claim 1, further comprising:
    training, by the system, the first machine learning model to output the first response portion based on the technical portion of the input query, wherein the training comprises:
        collecting data of completed customer service requests;
        transforming the data into the training data comprising question-and-answer pairs with the emotion portions removed; and
        tuning the first machine learning model with the question-and-answer pairs.

4. The computer-implemented method of claim 1, wherein the generating the second response portion comprises:
    classifying the input query into at least one emotion class of a group of emotion classes;
    selecting one or more emotion based prompts from a emotion based prompt bank based on emotion the at least one emotion class;
    concatenating the one or more emotion based prompts and the input query into one or more respective concatenated prompts; and
    inputting the one or more respective concatenated prompts and the input query to the second machine learning model.

5. The computer-implemented method of claim 4, wherein the one or more emotion based prompts comprise pairs of a question having an emotional tone and an emotion based answer based on an emotion class of the emotional tone of the question.

6. The computer-implemented method of claim 4, wherein the classifying comprises:
    generating classification labels and confidence scores of the classification labels; and
    categorizing the input query based on the classification labels and confidence scores.

7. The computer-implemented method of claim 4, wherein the respective concatenated prompts do not have an answer for the technical portion of the input query.

8. A computer program product, the computer program product comprising a non-transitory computer readable medium having program instructions embodied therewith, the program instructions executable by a processor to cause the processor to:
receive, by the processor, an input query comprising an emotion portion and a technical portion;
generate, by the processor, a filtered input query by removing the emotion portion from the input query;
generate, by the processor, using the filtered input query and a first machine learning model trained using training data having emotion portions removed, a first response portion that comprises only a technical response to the technical portion of the filtered input query;
generate, by the processor, using the input query and a second machine learning model that employs in-context learning based on an emotion classification of the emotion portion, a second response portion that comprises only an emotional response to the emotion portion of the input query; and
combine, by the processor, the first response portion and the second response portion into a final response.

9. The computer program product of claim 8, wherein the first machine learning model comprises a first GPT model that utilizes fine-tuning, and the second machine learning model comprises a second GPT model that utilizes the in-context learning.

10. The computer program product of claim 8, wherein the program instructions further cause the processor to:
train, by the processor, the first machine learning model to output the first response portion based on the technical portion of the input query, wherein the training comprises:
collecting data of completed customer service requests;
transforming the data into the training data comprising question-and-answer pairs with the emotion portions removed; and
tuning the first machine learning model with the question-and-answer pairs.

11. The computer program product of claim 8, wherein the generating the second response portion comprises:
classifying the input query into at least one emotion class of a group of emotion classes;
selecting one or more emotion based prompts from a emotion based prompt bank based on emotion the at least one emotion class;
concatenating the one or more emotion based prompts and the input query into one or more respective concatenated prompts; and
inputting the concatenated prompts and the input query to the second machine learning model.

12. The computer program product of claim 11, wherein the one or more emotion based prompts comprise pairs of a question having an emotional tone and an emotion based answer based on an emotion class of the emotional tone of the question.

13. The computer program product of claim 11, wherein the classifying comprises:
generating classification labels and confidence scores of the classification labels; and
categorizing the input query based on the classification labels and confidence scores.

14. The computer program product of claim 11, wherein the respective concatenated prompts do not have an answer for the technical portion of the input query.

15. A system comprising:
a memory that stores computer executable components; and
a processor, operably coupled to the memory, and that executes the computer executable components stored in the memory, wherein the computer executable components comprise:
a communications component that receives an input query comprising an emotion portion and a technical portion;
a filtering component that generates a filtered input query by removing the emotion portion from the input query;
a first machine learning model, trained using training data having emotion portions removed, that generates, using the filtered input query, a first response portion that comprises only a technical response to the technical portion of the filtered input query;
a second machine learning model, employing in-context learning based on an emotion classification of the emotion portion, that generates, using the input query, a second response portion that comprises only an emotional response to the emotion portion of the input query; and
a combination component that combines the first response portion and the second response portion into a final response.

16. The system of claim 15, wherein the first machine learning model comprises a first GPT model that utilizes fine-tuning, and the second machine learning model comprises a second GPT model that utilizes the in-context learning.

17. The system of claim 15, wherein the computer executable components further comprise a technical training component that trains the first machine learning model to output the first response portion based on the technical portion of the input query, wherein the training comprises:
collecting data of completed customer service requests;
transforming the data into the training data comprising question-and-answer pairs with the emotion portions removed; and
tuning the first machine learning model with the question-and-answer pairs.

18. The system of claim 15, wherein the computer executable components further comprise an in-context learning component that:
classifies the input query into at least one emotion class of a group of emotion classes;
selects one or more emotion based prompts from a emotion based prompt bank based on emotion the at least one emotion class;
concatenates the one or more emotion based prompts and the input query into one or more respective concatenated prompts; and
inputs the one or more respective concatenated prompts and the input query to the second machine learning model.

19. The system of claim 18, wherein the one or more emotion based prompts comprise pairs of a question having an emotional tone and an emotion based answer based on an emotion class of the emotional tone of the question.

20. The system of claim 18, wherein the respective concatenated prompts do not have an answer for the technical portion of the input query.

* * * * *